(12) United States Patent
Vinciarelli

(10) Patent No.: US 8,222,772 B1
(45) Date of Patent: Jul. 17, 2012

(54) POWER SUPPLY SYSTEM WITH POWER FACTOR CORRECTION AND EFFICIENT LOW POWER OPERATION

(75) Inventor: Patrizio Vinciarelli, Boston, MA (US)

(73) Assignee: VI Chip, Inc., Andover, MA (US)

( * ) Notice: Subject to any disclaimer, the term of this patent is extended or adjusted under 35 U.S.C. 154(b) by 346 days.

(21) Appl. No.: 12/701,983

(22) Filed: Feb. 8, 2010

(51) Int. Cl.
*H01N 9/54* (2006.01)

(52) U.S. Cl. ...................................... 307/140

(58) Field of Classification Search .................. 307/140
See application file for complete search history.

(56) References Cited

U.S. PATENT DOCUMENTS

| | | | |
|---|---|---|---|
| 4,937,728 | A | 6/1990 | Leonardi |
| 6,434,030 | B1 | 8/2002 | Rehm et al. |
| 7,561,446 | B1 | 7/2009 | Vinciarelli |
| 2008/0117656 | A1 | 5/2008 | Clarkin |

OTHER PUBLICATIONS

TEA1750 GreenChip III SMPS control IC, Rev. 1-6, Apr. 2007, published by NXP Semiconductor, Eindhoven, the Netherlands.

*Primary Examiner* — Robert L. DeBeradinis
(74) *Attorney, Agent, or Firm* — Fish & Richardson P.C.

(57) ABSTRACT

A method and apparatus for efficiently converting power from an AC line is disclosed. The power converter supplies power to the load, performing power factor correction at nominal and high loads, i.e. above a predetermined output power threshold, and operating in an on-demand burst mode at low loads, i.e. below a predetermined output power threshold, e.g. to supply power in a green mode to supervisory circuitry during a powered off state. The duration of an operating interval during which power conversion takes place may be reduced and varied at low loads as a function of the output power demands to increase overall conversion efficiency. The operating interval may be centered about a peak in the input voltage waveshape for operating intervals that are less than a full rectification period. For operating intervals that are less than a full rectification period a modified power factor correction may be used, in which the input current waveshape approximates the input voltage waveshape during the operating interval.

54 Claims, 12 Drawing Sheets

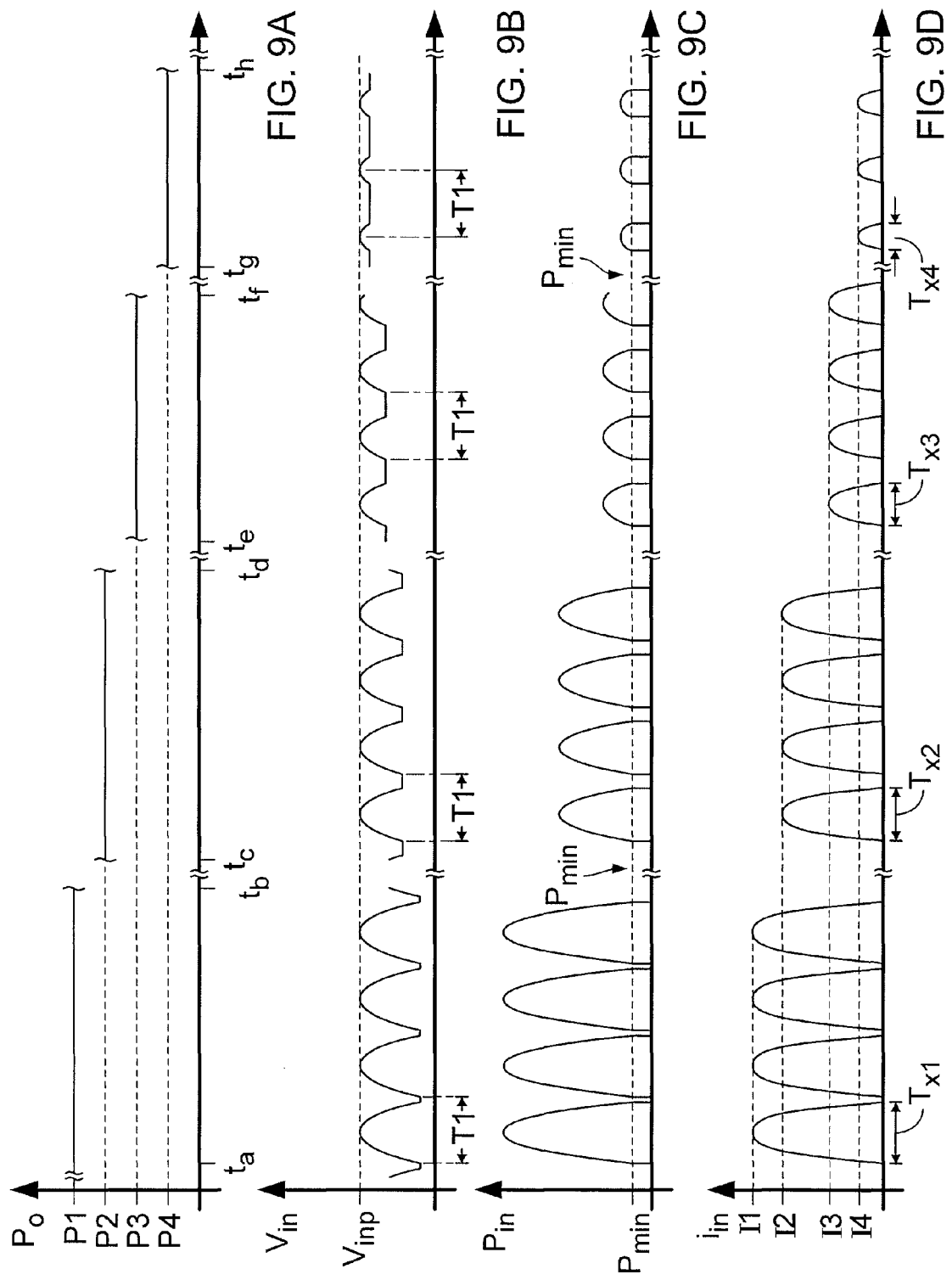

400 — Disable power delivery from the converter and store a value Vx, indicative of the instantaneous value of the converter input voltage, at a time when:

(1) power delivery from the converter is enabled

AND (2) the instantaneous power being delivered to the converter input falls below a pre-determined value, Pmin 402 — Enable power delivery from the converter at a time when:

(1) power delivery from the converter is disabled

AND (2) the converter input voltage is increasing and becomes greater than the value indicated by Vx.

FIG. 11

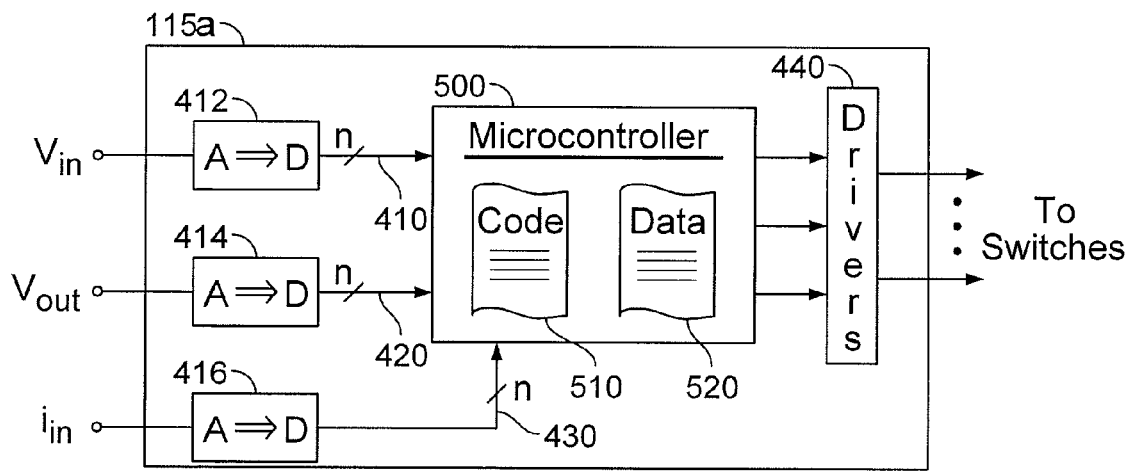

FIG. 12

POWER SUPPLY SYSTEM WITH POWER FACTOR CORRECTION AND EFFICIENT LOW POWER OPERATION

FIELD OF THE INVENTION

This invention relates to switching power supplies. More particularly, this invention relates to switching power supplies that operate efficiently at operating power levels that are relatively small compared to their full rated operating power levels.

BACKGROUND

Switching power supplies may be called upon to supply power to a load over a wide range: relatively large amounts of power may be required by a load in a "normal" operating mode, whereas relatively very little power may be required by the load during a "standby" operating mode. For example, an LCD flat-panel television receiver may require 350 Watts of operating power in normal operation but may only draw a small amount of power (e.g., 1 or 2 Watts) in a standby mode (i.e., when it is "turned off") in order, e.g., to keep remote-control circuitry active.

Power supplies that operate from AC utility lines ("off-line power supplies") may be called upon to meet special regulatory and performance requirements. For example, if the power drawn by a device from the AC utility line exceeds a certain limit (e.g., 75 Watts), it may be a requirement that the power supply in the device operate in a power-factor-correcting mode; on the other hand, it may also be a requirement that the power supply draw less than a specified amount of power (e.g., 5 Watts) from the utility lines when the device is in a standby mode of operation, in order to minimize energy utilization.

Off-line switching power supplies with power factor correction are well known in the art. Such supplies typically comprise a rectifier, to convert the AC utility line voltage into a unipolar pulsating input voltage, and a DC-DC converter that comprises one or more switches that are controlled by a controller. The controller controls the switches, at a switching frequency that may be much higher than the frequency of the AC utility source, to convert the unipolar pulsating input voltage into one or more controlled DC voltage outputs while also performing power factor correction (e.g., by forcing the waveshape of the current drawn from the AC utility source to follow the waveshape of the voltage delivered by the AC utility source). In normal operation, when supplying relatively high levels of power, the relatively high frequency switching may take place essentially continuously and the power supply may exhibit relatively high conversion efficiency. Continuous operation at relatively low load power levels, however, may present difficulties: e.g., it may be difficult to achieve switch duty cycles that are sufficiently low to maintain voltages within regulation; switching losses in continuous operation may result in objectionable losses. Lowering the switching frequency may produce audible noise.

One way to modify operation of an off-line, power-factor-corrected, isolated, switching power supply, at low power, is described in a datasheet for a power supply controller entitled *TEA1750 GreenChip III SMPS control IC*, Rev. 1-6 Apr. 2007, published by NXP Semiconductor, Eindhoven, the Netherlands. The NXP controller operates in a first operating mode, in which power-factor-correction and output control are performed at a continuous high switching frequency, when the power delivered by the power supply is high; the controller operates the power supply in another operating mode, called a "burst mode," when the power delivered by the power supply is low. In burst mode, the power supply alternates between periods during which high-frequency switching occurs and periods during which no switching occurs. The NXP controller varies the frequency of the bursts as a function of the load power and a value of a circuit capacitor; audible noise may be reduced by initiating a "soft-start" mode during each burst. Another version of standby mode control is described in Rehm et al, U.S. Pat. No. 6,434,030, Arrangement Having a Switched-Mode Power Supply and a Microprocessor, issued Aug. 13, 2002. In Rehm, an off-line, isolated, flyback switching power supply is controlled to operate at low power in a burst mode at a pre-defined burst repetition frequency (e.g., 100 Hz) that is programmed into and controlled by a microprocessor. Yet another technique is described in Leonardi, U.S. Pat. No. 4,937,728, Switch-Mode Power Supply with Burst Mode Standby Operation, issued Jun. 26, 1990. In Leonardi, a burst mode in an off-line, isolated, flyback switching power supply is synchronized to the frequency of the utility line, the length of the each burst being essentially fixed to correspond to one-quarter of each AC utility line cycle.

SUMMARY

In one aspect, in general, an apparatus may include a unipolar input for receiving a pulsating unipolar input voltage characterized by a series of unipolar pulses, the pulses being characterized by a pulse waveform, a pulse duration, and a characteristic frequency. The apparatus may include a first DC-DC switching power converter for converting power received from the unipolar input for delivery to a first load via a first output at a first DC output voltage, the first DC-DC switching power converter including one or more switches. The apparatus may include a controller for operating the one or more switches in a series of converter operating cycles, to control the first DC output voltage to be substantially equal to a pre-determined value over a range of power levels delivered by the converter. The converter operating cycles may include a duration defining a converter operating period, and the converter operating period may be 1% or less of the pulse duration. The first power converter may be adapted to convert power via the first output for delivery to the first load during an operating interval, the operating interval including a selected portion of the pulse duration, and to refrain from converting power via the first output for delivery to the first load during the remainder of the pulse duration; and to vary the duration of the operating interval as a function of the magnitude of the power converted by the first DC-DC switching power converter.

Implementations of the apparatus may include one or more of the following features. The first DC-DC switching power converter may be a flyback converter. The first load may include a second DC-DC converter that delivers power to first load circuitry. The apparatus may include an AC input for receiving power from an AC source and a rectifier having an input connected to the AC input and an output connected to the unipolar input. The rectifier may provide full-wave rectification, the AC source can have a frequency that is one half of the characteristic frequency of the unipolar input voltage and have a period that is approximately twice the pulse duration. The apparatus may include an input capacitance connected across the unipolar input. The controller may adjust the phase angle of the operating interval relative to the unipolar input towards centering the operating interval about a peak in the pulse waveform. A current operating interval may be terminated at a time, $t_{dis}$, when instantaneous power being delivered by the converter falls below a pre-determined value, $P_{min}$; and a successive operating interval can begin at a time following $t_{dis}$, when the instantaneous unipolar input voltage is increasing and becomes greater than a predetermined threshold voltage, $V_{th}$. The predetermined threshold voltage, $V_{th}$, may be set to a value corresponding to the instantaneous unipolar input voltage at the time, $t_{dis}$, that the current operating interval is closed.

The first DC-DC switching power converter may include a double-clamped buck-boost converter. The switch controller may adjust the envelope of current drawn during the operating interval by the first DC-DC power converter from the unipolar input to approximate the pulse waveform during the operating interval. The switch controller may adjust the envelope of current drawn during the operating interval by the first DC-DC power converter from the unipolar input to approximate the pulse waveform during the operating interval when the power delivered by the converter is greater than a pre-determined value. The first power converter may include a second output for delivering power to a second load and wherein the first power converter may be adapted to convert power via the second output for delivery to the second load during the operating interval. In some examples, the first power converter may be adapted to refrain from converting power via the second output for delivery to the second load at times outside of the operating interval. In some examples, the first power converter may be adapted to convert power via the second output for delivery to the second load at times outside of the operating interval.

The switch controller may adjust the envelope of current drawn during the operating interval by the first DC-DC power converter from the unipolar input to approximate the pulse waveform during the operating interval. The controller may be configured to control the amount of energy delivered during each converter operating cycle to vary as a function of the square of an error signal. The apparatus may include an integrating amplifier configured to compare a signal indicative of the first output voltage to a signal indicative of a desired value for the first output voltage, and produce an integrated error signal; a normalizer configured to produce an envelope signal representing a desired value for the current drawn from the unipolar input; and a multiplier configured to provide the error signal representative of the product of the integrated error signal and the envelope signal. The first DC-DC switching power converter may include a double-clamped buck-boost converter and the controller may be configured to control the duration of an energy storage phase within a converter operating cycle to increase in proportion to an increase in the error signal. The envelope signal may include variations synchronized to the unipolar input voltage and approximating the pulse waveform. The apparatus may include an AC input for receiving power from an AC source and a rectifier having an input connected to the AC input and an output connected to the unipolar input and wherein the envelope signal may include variations synchronized to the AC source and approximating a waveform of the absolute value of the AC source. The controller may adjust the phase angle of the operating interval relative to the unipolar input towards centering the operating interval about a peak in the pulse waveform. The apparatus may include a power sense circuit for delivering a signal indicative of the instantaneous power processed by the first DC-DC switching power converter. A current operating interval may be closed at a time, $t_{dis}$, when instantaneous power being delivered by the converter falls below a pre-determined value, $P_{min}$; and a successive operating interval may be opened at a time following $t_{dis}$, when the instantaneous unipolar input voltage is increasing and becomes greater than a predetermined threshold voltage, $V_{th}$. The predetermined threshold voltage, $V_{th}$, may be set to a value corresponding to the instantaneous unipolar input voltage at the time, $t_{dis}$, that the current operating interval is closed.

The switch controller may adjust the envelope of current drawn during the operating interval by the first DC-DC power converter from the unipolar input to approximate the pulse waveform during the operating interval when the power delivered by the converter is greater than a pre-determined value. The controller may refrain from adjusting the envelope of the input current during the operating interval when the power delivered by the converter is less than a pre-determined value. The controller may be configured to increase the duration of the operating interval as the power delivered by the first DC-DC converter increases. The controller may be configured to set the duration of the operating interval to a predetermined maximum whenever the magnitude of the power converted by the first DC-DC switching power is above a pre-determined value. The predetermined maximum may include 98% or more of the pulse duration. The predetermined maximum may include the rectification period. The first power converter may include a second output for delivering power to a second load and wherein the first power converter may be adapted to convert power via the second output for delivery to the second load during the operating interval. In some examples, the first power converter may be adapted to refrain from converting power via the second output for delivery to the second load at times outside of the operating interval. In some examples, the first power converter may be adapted to convert power via the second output for delivery to the second load at times outside of the operating interval.

In another aspect, in general, a method includes receiving at an input, a pulsating unipolar input voltage characterized by a series of unipolar pulses, the pulses being characterized by a pulse voltage-waveform, a pulse duration, and a characteristic frequency. The method includes converting, in a first DC to DC power conversion stage, power received from the pulsating unipolar input in a series of converter operating cycles, each having a duration that is 1% or less of the pulse duration, for delivery to a first load connected to a first output at a first DC output voltage. The method includes controlling the first DC output voltage to be substantially equal to a pre-determined value over a range of power levels delivered by the first power conversion stage, enabling the converting via the first output for delivery to the first load during an operating interval including a selected portion of the pulse duration, disabling the converting via the first output for delivery to the first load during the remainder of the pulse duration, varying the duration of the operating interval as a function of the magnitude of the power converted by the first DC-DC power conversion stage, and adjusting an envelope of current drawn during the operating interval by the first DC-DC power conversion stage from the input to approximate the pulse voltage waveform during the operating interval for predetermined operating criteria.

Implementations of the method may include one or more of the following features. In some examples, the predetermined operating criteria may include all power levels in the range of power levels delivered by the first power conversion stage. In some examples, the predetermined operating criteria may include power levels within the range exceeding a predetermined threshold. The method may include essentially fixing the duration of the operating interval at a predetermined maximum duration for power levels within the first portion of the range. In some examples, the predetermined maximum duration may be set essentially equal to a rectification period. In some examples, the predetermined maximum duration may be less than the rectification period. The controller may vary the duration of the operating interval when the power delivered to the output is within a second portion of the range of power levels. The second portion of the range may include power levels within the range below a predetermined threshold.

The method may include reducing the duration of the operating interval as the power delivered to the output is reduced within the second portion of the range. The method may include providing galvanic isolation between the input and the first output. The method may include adjusting the phase angle of the operating interval relative to the unipolar input towards centering the operating interval about a peak in the pulse waveform. The method may include terminating a current operating interval at a time, $t_{dis}$, when instantaneous power being delivered by the converter falls below a predetermined value, and starting a successive operating interval at a time following $t_{dis}$, when the instantaneous unipolar input voltage is increasing and becomes greater than a predetermined threshold voltage, $V_{th}$. The method may include setting the predetermined threshold voltage, $V_{th}$, to a value corresponding to the instantaneous unipolar input voltage at the time, $t_{dis}$, that the current operating interval is closed. The method may include inhibiting operating intervals during selected ones of the unipolar pulses in the series of unipolar pulses. The selected ones of the unipolar pulses may be separated by at least one unipolar pulse. The method may include receiving power from an AC source, rectifying the received power, and supplying the rectified power to the input. The method may include storing energy received from the output. The method may include converting power received from the output for delivery of a second DC output voltage to a regulator output, wherein the first DC output voltage is greater than the second DC output voltage. The method may include providing a plurality of second DC output voltages to a plurality of regulator outputs.

In another aspect, in general, a method is provided for controlling the duration of an operating interval in a switching power converter of the kind that receives power from a pulsating input source, each of the pulses occurring within a characteristic period defined by a characteristic frequency of an input source, and delivers power to a first output during the operating interval, the operating interval including a selected portion of a characteristic period, and refrains from delivering power to the first output during the remainder of the characteristic period. The method includes disabling power delivery from the converter at a time, tdis, when power delivery from the converter is enabled and the instantaneous power being delivered to the converter input falls below a pre-determined value, Pmin. The method includes enabling power delivery from the converter, at a time following tdis, when power delivery from the converter is disabled, the converter input voltage is increasing, and the converter input voltage becomes greater than the value that it was at time tdis.

Implementations of the method may include one or more of the following features. The method may include determining and storing a value Vx, indicative of the value of the converter input voltage at time tdis, and determining, at a time following tdis and when the converter input voltage is increasing, when the converter input voltage becomes greater than the value indicated by Vx.

The details of one or more embodiments of the invention are set forth in the accompanying drawings and description below. Other features, objects, and advantages of the invention will be apparent from the description and drawings, and from the claims.

DESCRIPTION OF DRAWINGS

FIGS. 9A-9D show waveforms for the power supply system of FIGS. 6 and 7 at different operating power levels.

FIG. 11 shows a method for controlling the power supply system of FIG. 6.

FIG. 12 shows a digital embodiment of a switching power supply controller.

Like references symbols in the various drawings indicate like elements.

DETAILED DESCRIPTION

Figure 1:
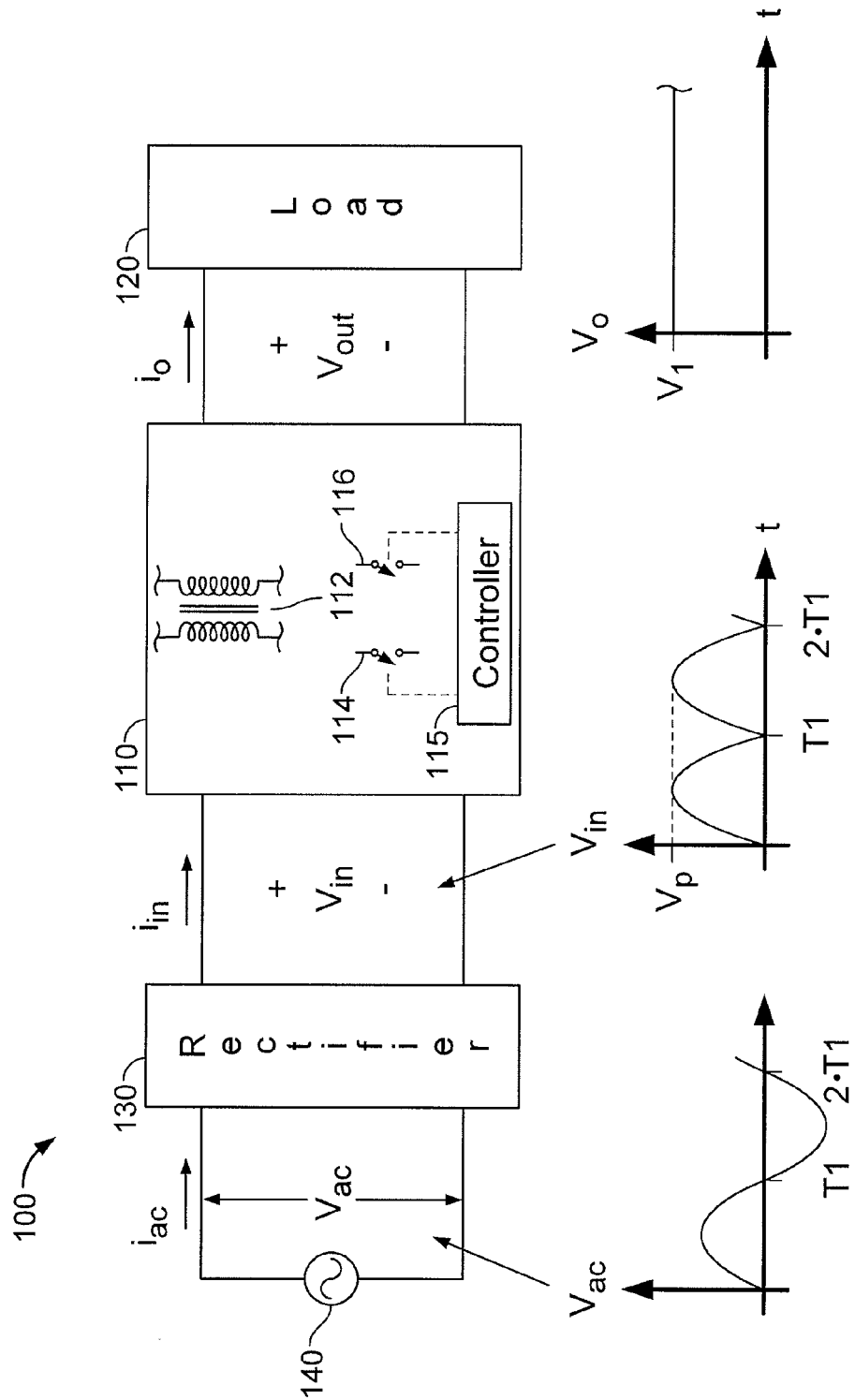
FIG. 1 shows a block diagram of an off-line switching power supply system.

FIG. 1 shows a block diagram of a switching power supply system 100. The system comprises a switching power converter 110 that accepts a unipolar input voltage, $V_{in}$, at its input and delivers a DC output voltage, $V_{out}$, to a load 120 connected to its output. In FIG. 1, the voltage $V_{in}$ is shown to be a unipolar time-varying input voltage that is derived by rectifying (by means of rectifier 130) an AC input source 140. As shown in FIG. 1, the unipolar time-varying input voltage, $V_{in}$, has a characteristic frequency, $f_c=1/T1$ (where T1 is the characteristic period of the input voltage $V_{in}$), that is directly related to the frequency of the AC input source 140, $f_{ac}$, ($f_c=2f_{ac}$).

The switching power converter 110 is shown to comprise one or more switches, e.g. switches 114, 116, and a controller 115. The controller 115 operates the one or more switches at a converter operating frequency, $f_o$, that is much greater than the characteristic frequency, $f_c$, of the unipolar time-varying input voltage $V_{in}$ to transfer energy from the converter input to the load and to control the output voltage, $V_{out}$, as the power delivered to the load varies over a range of power levels. The controller may also perform power factor correction ("PFC") by also controlling the switches to force the low-frequency envelope of high-frequency current pulses, i.e. the line-frequency of the current, $i_{ac}$, drawn from the AC utility source, to follow the waveshape of the voltage, $V_{ac}$, delivered by the AC utility source.

The switching power converter 110 may be non-isolated, or it may be isolated (as indicated by the transformer 112, FIG. 1) to provide galvanic isolation between $V_{in}$ and $V_{out}$, and may be any one of a wide variety of switching power converter topologies: e.g., buck, boost or buck-boost PWM; flyback. In a preferred embodiment the power converter 110 may comprise a double-clamped ZVS buck-boost power converter, e.g. as described in Vinciarelli, Double-Clamped ZVS Buck-Boost Power Converter, U.S. Pat. No. 7,561,446, issued Jul. 14, 2009 and incorporated herein in its entirety by reference (the "Double-Clamped Patent").

Figure 2:
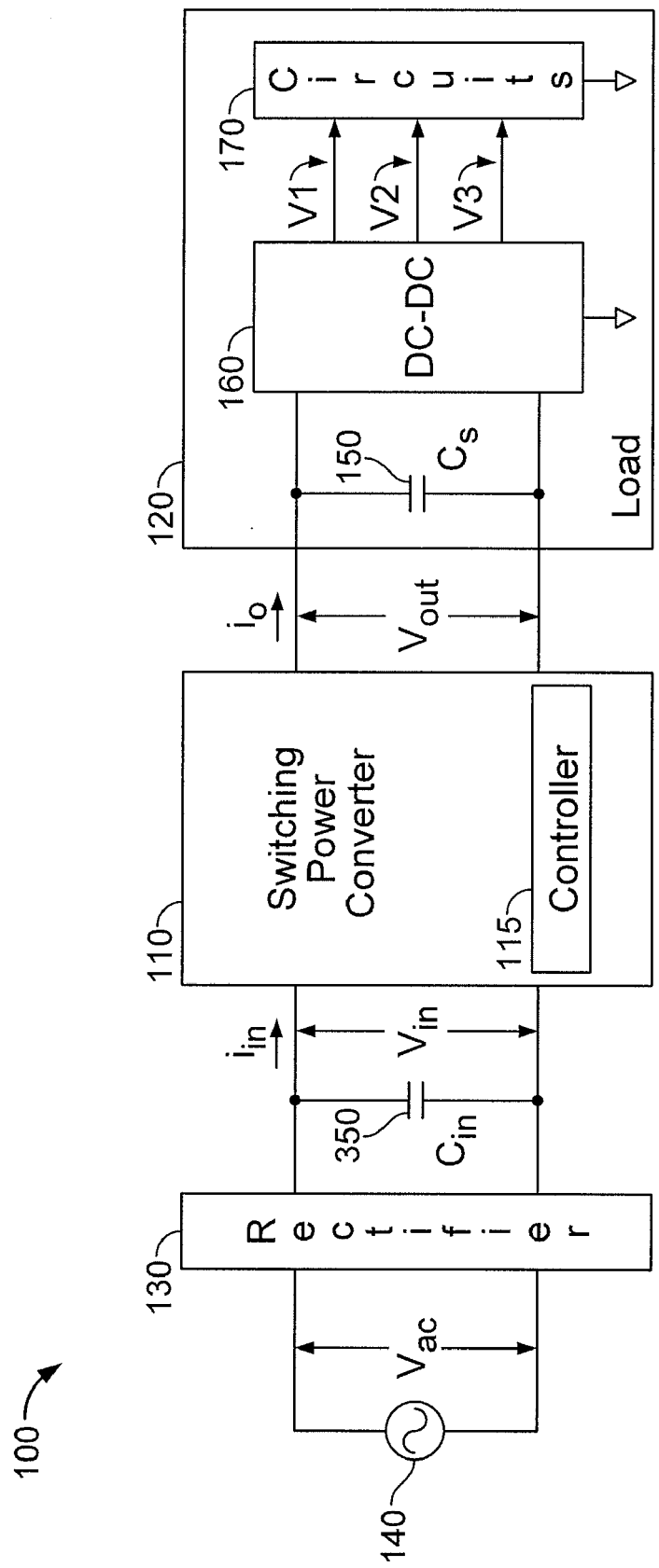
FIG. 2 shows another block diagram of an off-line switching power supply system.
Figure 3A:
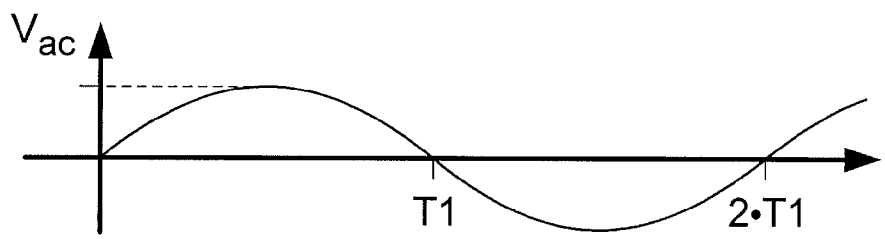
FIGS. 3A-3D show waveforms in the power supply system of FIG. 2.
Figure 3B:
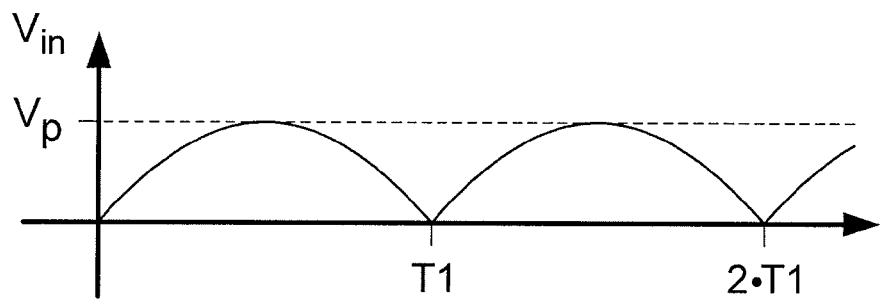
Figure 8A:
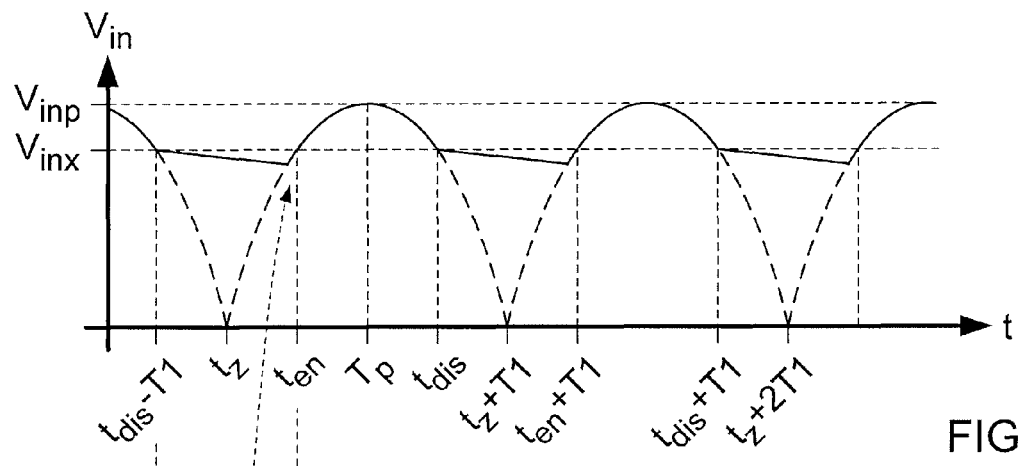
FIGS. 8A-8D show waveforms for the power supply system of FIGS. 6 and 7.
Figure 8B:
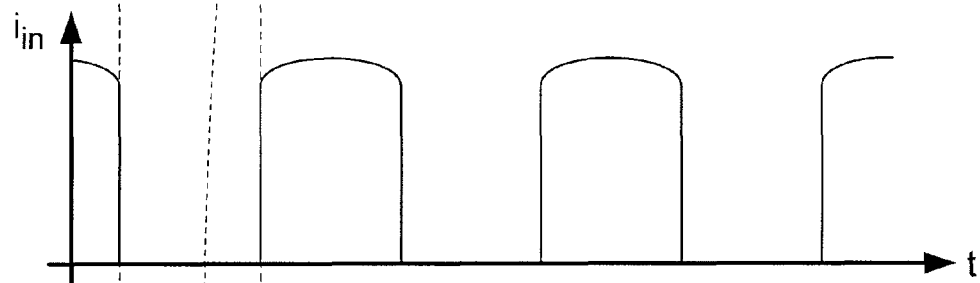
Figure 8C:
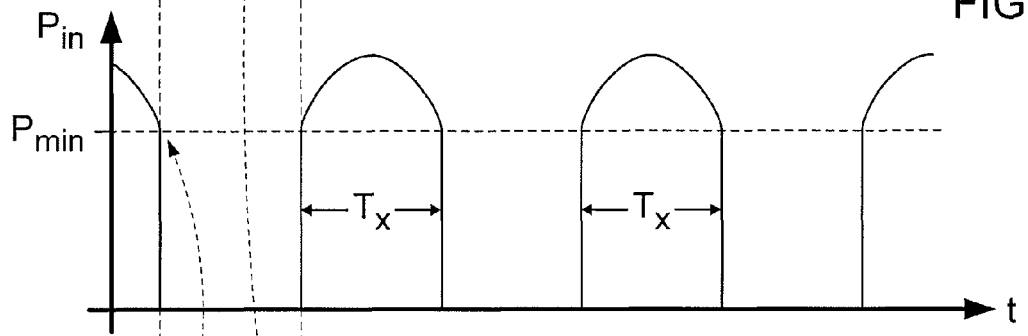
Figure 8D:
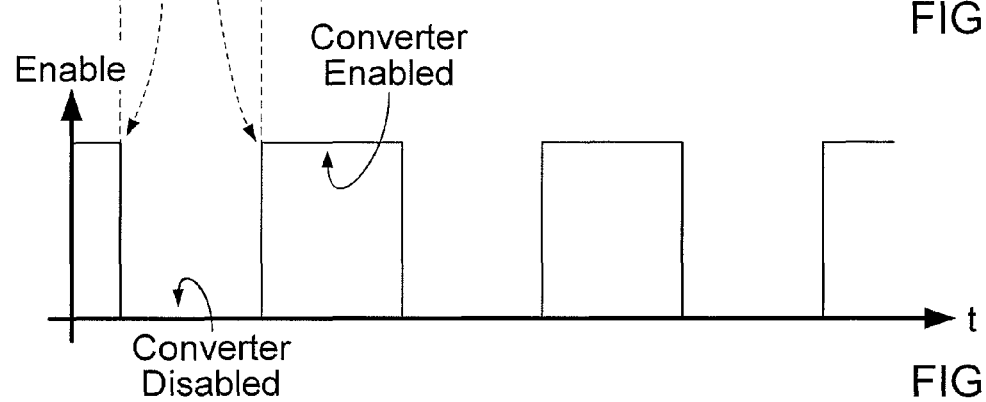

FIG. 2 shows an example of a power supply system 100 of the kind shown in FIG. 1. In FIG. 2 the load 120 comprises a capacitor 150 and a DC-DC converter 160. The DC-DC converter 160 is cascaded relative to the switching power converter 110 (i.e., the DC-DC converter 160 receives its input power from the output of the switching power converter 110). Capacitor 150 represents all of the capacitance at the output of converter 110, including output filter capacitance that may be included in power converter 110 and input capacitance that may be included in load 120. Input capacitor 350 may represent all of the capacitance at the input of the converter 110, and may include capacitance associated with input EMI filter circuitry (not shown) and discrete capacitance for controlling the impedance at the input of the converter 110. The DC-DC converter 160 may as shown supply one or more output voltages (e.g., voltages V1, V2, V3, FIG. 2) to circuitry 170. The output voltage, $V_{out}$, of converter 110 may preferably be greater than one or more of the output voltages V1, V2, V3 of converter 160. The circuitry 170 may, for example, comprise the electronic and display components of an LCD flat-panel television set. Waveforms for the system 100 of FIG. 2, at a relatively high load power, are shown in FIGS. 3A to 3D. FIGS. 3A and 3B show, respectively, the AC input source voltage, $V_{ac}$, and the rectified unipolar time-varying input voltage, $V_{in}$, delivered by the rectifier 130 to the input of the switching power converter 110. The waveform of the input voltage $V_{in}$ may be affected by the presence of input capacitance and the operation of the converter 110, as shown in FIGS. 8A and 9B and discussed in more detail below.

Figure 3C:
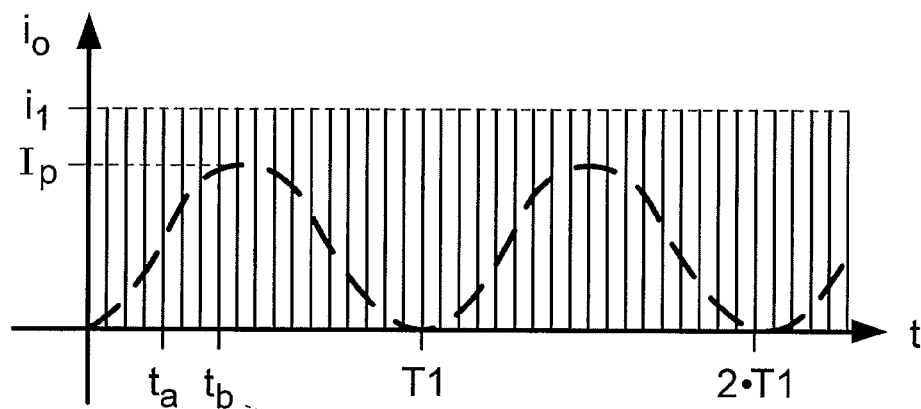
Figure 3D:
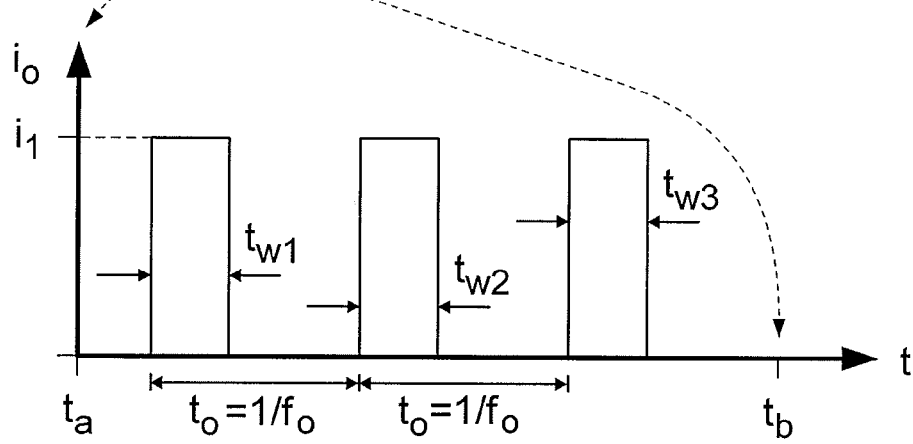

Referring to FIG. 3C, the converter output current $i_o$ may be delivered as a series of high-frequency (relative to $f_{ac}$) current pulses (shown as vertical lines in FIG. 3C). Each current pulse may occur within a respective one of a series of converter operating cycles, for example, as described in the Double-Clamped Patent. The duration $t_0$ (FIG. 3D) of the converter operating cycle may be referred to as the converter operating period. FIG. 3D is a temporally magnified view of a portion of the waveform of FIG. 3C, showing that the operating cycles and pulses of current may occur at an essentially fixed converter operating frequency, $fo = 1/t_o$, that is much higher than the characteristic frequency, $1/T1$, of the unipolar time-varying input voltage $V_{in}$. In some implementations, the converter operating period preferably may be set to 1% or less of the characteristic period T1 of the input voltage $V_{in}$. As also illustrated in FIG. 3D, the duty cycle, $D = t_w/t_o$, of the current pulses (where $t_w$ is the width of a current pulse within each operating cycle of duration $t_o$) may be varied as a means of varying the average value of the current $i_o$ (e.g., as indicated in FIG. 3D by the variation in the widths tw1, tw2, tw3). Capacitor 150 may smooth the pulsating output of the converter 110 providing the filtered DC voltage, $V_{out}$. Capacitor 150 may also provide intermediate energy storage to support operation of the load 120, e.g. during momentary AC utility source outages.

Depending upon the specific power conversion topology used, controller 115 may vary one or more of (a) the duty cycle, i.e. pulse width tw1 (FIG. 3D), (b) the converter operating frequency, $f_o = 1/t_o$ (FIG. 3D), and (c) the amplitude of the pulses of current, $i_1$, delivered by the converter 110 (FIG. 3D), as a means of controlling the output voltage, $V_{out}$, and for forcing the low-frequency envelope of the input current to match the waveshape of the input voltage such as during power factor correction operation. The dashed sinusoidal waveform shown in FIG. 3C represents the envelope of the current, $i_o$, i.e. the value of $i_o$ averaged over time periods that are relatively long compared to $t_o$ but relatively short compared to T1. The current envelope (dashed sinusoidal waveform) may be representative of the current $i_o$ delivered by a power factor corrected converter 110 when the converter is connected to a sinusoidal AC line voltage source 140 via a full-wave rectifier 130 and is accordingly shown having a period T1. The amplitude of the envelope of the converter output current decreases (resulting in a decrease in the peak current amplitude, Ip, FIG. 3C) as the load power decreases.

As the load power decreases, the duty cycle or operating frequency of the converter 110, or both may also decrease. As noted earlier, practical limitations on duty cycle control may result in reduced converter operating efficiency and difficulty in maintaining regulation. One conventional way to circumvent such difficulties is to reduce the converter operating frequency. However, reducing the converter operating frequency may produce audible noise. Another conventional method changes between different operating modes, i.e. invoke a different operating mode when the power delivered by the converter reaches a relatively low level.

Figure 4:
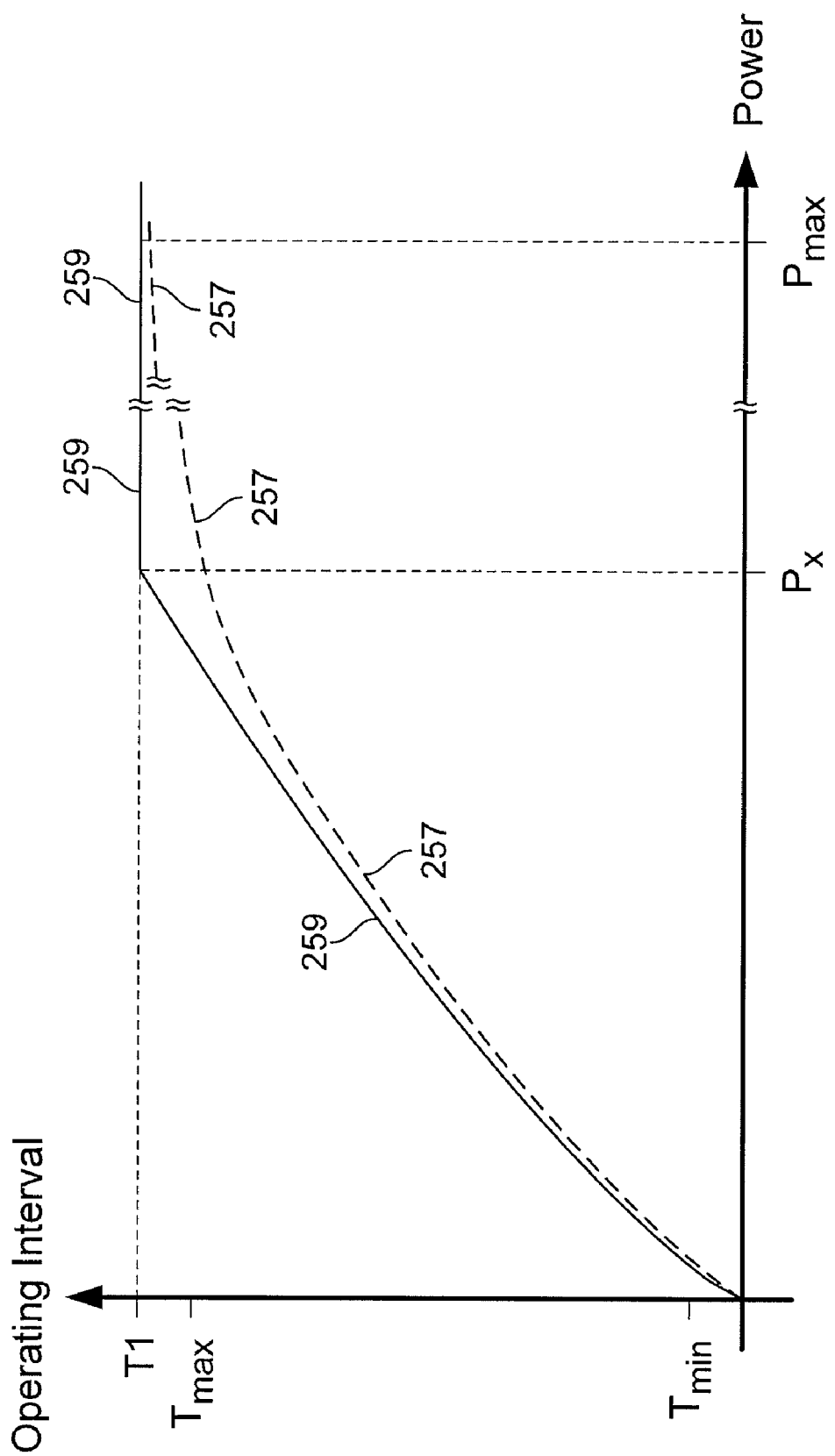
FIG. 4 shows a transfer function relating an operating interval to delivered power.
Figure 5:
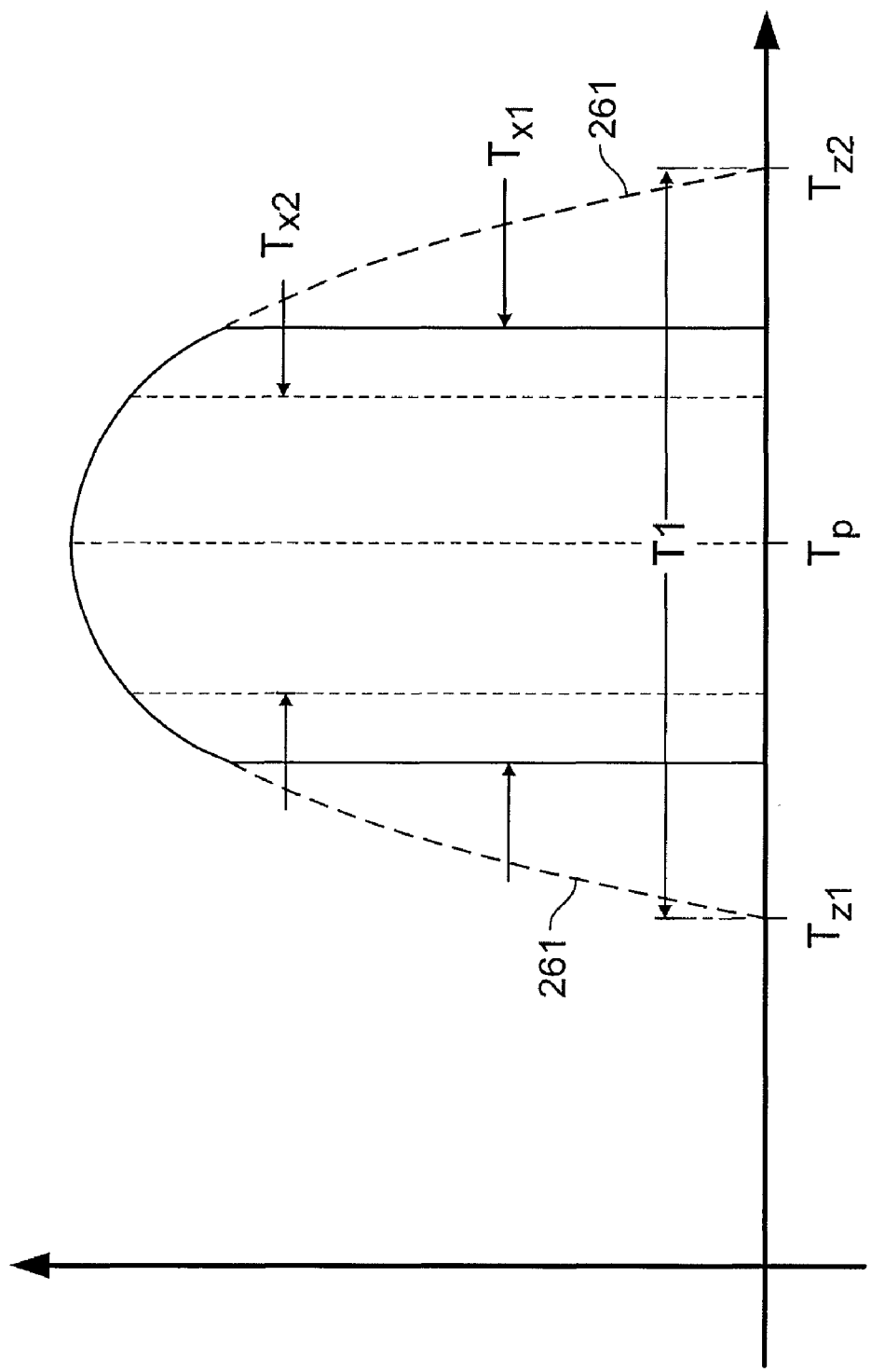
FIG. 5 shows a waveform illustrating input current envelope and operating interval timing relative to input voltage waveform.

As shown in FIGS. 4 and 5, the power supply system 100 of FIG. 2 may be operated in a single mode continuously variable from full PFC mode to standby mode avoiding invocation of different operating modes for "normal" (i.e., relatively high power) and "standby" (i.e., relatively low power) operation. The converter may be operated in a series of "operating intervals" each of which may be matched to a respective cycle of the characteristic frequency, i.e. a respective unipolar pulse, 0-T1, T1-T2, T2-T3, etc. of the time-varying converter input voltage, $V_{in}$. The length of each operating interval may be selectively varied by the controller 115 as a function of the power being delivered by the switching power converter 110 between a predetermined minimum duration, e.g. 0, and a predetermined maximum duration, e.g. T1.

FIG. 4 shows a conceptual transfer function of operating interval duration as a function of power illustrating continuously variable operation of the converter between full PFC and standby modes. FIG. 5 shows the envelope of converter current during the operating interval superimposed on the input voltage waveform illustrating how the duration, $T_{x1}$, $T_{x2}$, of the operating intervals may be controlled. The power converter may operate over a range of power levels between zero power and a maximum rated power, $P_{max}$. As shown in FIG. 4, the operating interval increases as the operating power increases and vice versa. In some embodiments, illustrated by the dashed curve 257 in FIG. 4, the operating interval may approach, but never exceed, a maximum value of T1 (the characteristic period of the converter input voltage $V_{in}$); in other embodiments, as illustrated by the solid curve 259 in FIG. 4, the duration of the operating interval may be essentially equal to T1 for power levels above some pre-determined value $P_x$ and be controlled to be of shorter duration for power levels below $P_x$. FIG. 4 is illustrative only. In practice, the "transfer function" for a switching power supply system 100 may be based upon more than a single variable such as power. Rather, the length of an operating interval may be controlled as a function of a combination of factors, including, e.g., specific converter operating conditions (e.g., magnitude of input voltage; amount of power delivered) and the choice of power converter and controller topologies.

Referring to FIG. 5, a methodology for controlling the duration and phase angle of the operating interval for sinusoidal and other symmetrical input voltage waveshapes will be described. In FIG. 5, the dashed waveform 261 references a half-cycle of a rectified sinusoidal AC voltage source 140. Times Tz1 and Tz2 correspond to times which the AC source 140 crosses zero volts (the difference between Tz2 and Tz1 being equal to the characteristic period of the converter input voltage, T1). Although the dashed waveform in FIG. 5 represents a complete half-cycle of a sinusoidal wave implying ideal rectification (a rectification period equal to 100% of each half cycle of the sinusoidal input voltage), non-ideal rectifiers may reduce the rectification period to less than 100% of each half-cycle, e.g. 98% of the half-cycle, effectively reducing T1 and thus limiting the maximum available operating interval. Time, Tp, corresponds to the time of occurrence of the peak value of the AC source voltage. FIG. 5 shows the envelope of the input current $i_{in}(t)$ during a first operating interval of duration Tx1 at an operating power level P1 (solid outline), and during a second operating interval of duration Tx2 at an operating power level P1, where P1>P2 and Tx1>Tx2 (dashed outline). Note that the envelope of the input current $i_{in}(t)$ during the operating interval may be controlled to follow the waveform of the input voltage during the operating interval approximating PFC with operating intervals shorter than the rectification period.

As shown in FIG. 5, each illustrated operating interval begins after Tz1 and ends prior to Tz2. As power decreases the duration of the operating interval may become shorter; as power increases the duration of the operating interval may become longer. A controller according to the present disclosure therefore may set an upper limit, Tmax<T1, and a lower limit, Tmin<Tmax, on the length of the operating interval (FIG. 4). Thus, as shown in FIG. 5, as operating power decreases in a converter according to the present disclosure, the duration of an operating interval may be controlled to be less than T1 by controlling the times at which the operating interval begins and ends to occur closer in time to the time Tp.

The operating interval may represent a portion of the period T1 in which the switching power converter 110 converts power from the input for delivery to load 120. As described above, the switching power converter 110 may operate in a series of converter operating cycles in which the converter operating period may be, for example, 1% or less of the period T1 of the input voltage $V_{in}$. During the remaining portion of the period T1 outside the operating interval, the switching power converter 110 may refrain from converting power from the input for delivery to load 120.

Figure 6:
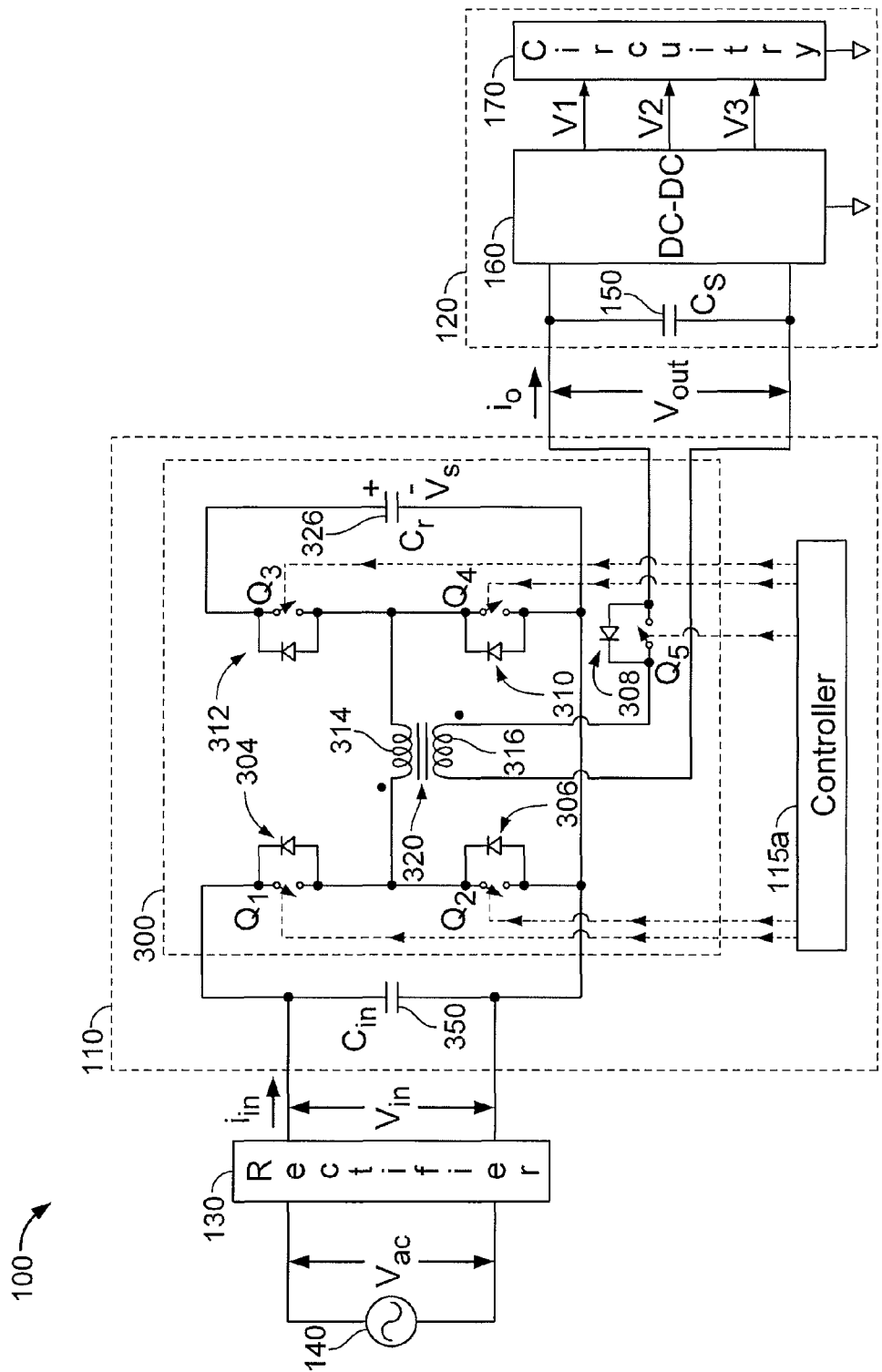
FIG. 6 shows an embodiment of an off-line switching power supply system comprising a double-clamped ZVS buck-boost converter.
Figure 7:
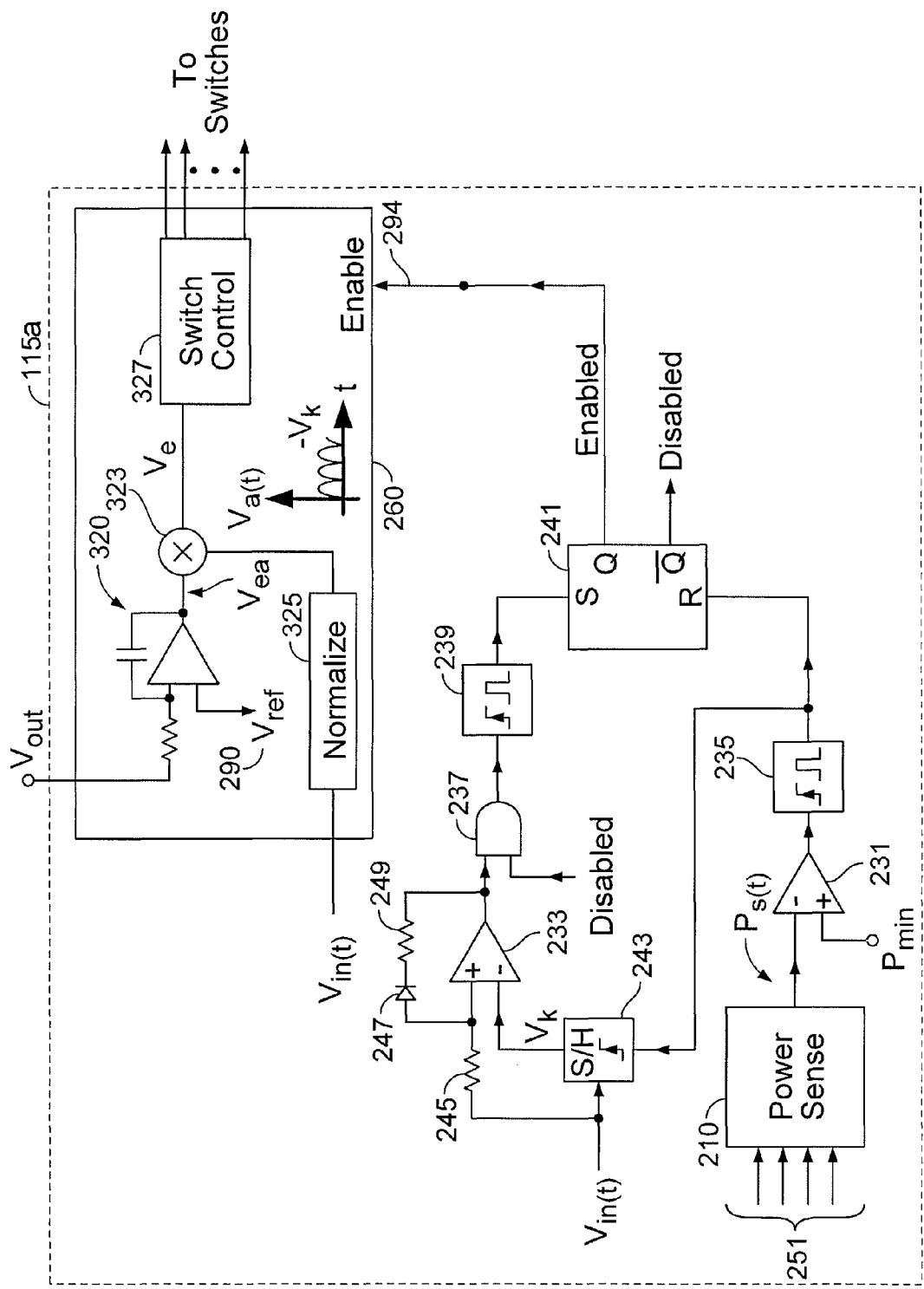
FIG. 7 shows a block diagram of a controller for use in the power supply system of FIG. 6.

FIG. 6 shows a schematic of a preferred embodiment of a converter 100 according to the present disclosure. In FIG. 6, the power supply system 100 comprises a switching power converter 110 and a double-clamped ZVS buck-boost converter 300 of the kind described in the Double-Clamped Patent. FIG. 7 shows a simplified block diagram of a controller 115a for controlling the operation of the converter 300 of FIG. 6. As discussed in the Double-Clamped Patent, the double-clamped ZVS buck-boost converter 300 may comprise a transformer 314, for providing isolation and voltage transformation; a clamp capacitor $C_R$ 326; and five switches, Q1-Q5 304, 306, 312, 310, 308 (in FIG. 6 each of the switches Q1-Q5 is shown as comprising an ideal switch in parallel with a diode; in practice these switches may be MOSFETs and the diodes may be intrinsic diodes). In operation, the controller 115a in the system of FIG. 6 controls the relative timing and durations of the ON-times of the switches Q1-Q5 as a means of maintaining the converter output voltage $V_{out}$ at some pre-determined value as well as performing input power factor correction. Operating details of the double-clamped ZVS buck-boost converter 300 are discussed in the Double-Clamped Patent. The switching power converter 110 of FIG. 6 also includes an input bypass and storage capacitor $C_{IN}$ 350 to provide a low impedance at the input of the converter 300. Although the double-clamped converter 300 of FIG. 6 is shown to have only one secondary 316 delivering power to one output, it is understood that a converter 300a may, as shown in the partial schematic in FIG. 10, comprise a plurality of secondary windings 316a-316n and corresponding switches Q5a-Q5n for delivering power to respective outputs 120a-120n.

As shown in FIG. 7, the controller 115a may comprise a power sensor circuit 210, first and second comparators 231, 233, positive edge-triggered pulse generators 235, 239, a set-reset flip-flop 241, AND gate 237, positive edge-triggered sample-and-hold 243 and a power factor corrector and switch controller 260. For the double-clamped converter 300 of FIG. 6, the PFC and switch controller 260 may be of the kind described in the Double-Clamped Patent. As shown in FIG. 7, the PFC and switch controller 260 comprises a switch control circuit 327; an integrating error amplifier circuit 320; a normalizer 325 and a multiplier 323. Normalizer 325 accepts the unipolar converter input voltage, $V_{in}$, and delivers an output, Vn, that has the same waveshape as $V_{in}$ buta fixed amplitude, Vk. In some embodiments the normalizer 325 may accept a waveform indicative of the waveform of the absolute value of the AC input source 140.

Whenever an enable input 294 to the PFC and switch controller 260 is true, the PFC and switch controller 260 will control the switches (e.g., switches Q1-Q5 304, 306, 312, 310, 308, FIG. 6) in the switching power converter 110 as a means of maintaining the voltage $V_{out}$ at a desired setpoint value (as indicated, e.g., by the reference voltage Vref 290, FIG. 7). When the enable input 294 is false, the switching power converter 110 will be disabled.

The power sense circuit 210 may be any of a wide variety of circuits for delivering a signal, Ps(t), indicative of the instantaneous magnitude of the converter input power, $P_{in}(t) = V_{in}(t) \cdot i_{in}(t)$. In FIG. 7 the power sense circuit 210 is shown receiving several inputs 251: these inputs may comprise, e.g., measurements indicative of the converter input voltage $V_{in}(t)$ and the converter input current $i_{in}(t)$. However, as discussed below, in a controller for use with certain types of power converters 300, such as, e.g., the Double-Clamped converter 300 of FIG. 6 or an isolated or non-isolated flyback converter, it may be possible to derive the signal Ps(t) from the output of error voltage amplifier 320.

In the controller of FIG. 7, the switch controller 327 may be configured to control the duration of the "energy storage phase" (as that term is defined in the Double-Clamped Patent; the duration of the energy storage phase is substantially equal to the length of time that Q1 and Q4 (FIG. 6) are simultaneously on) during each converter operating cycle to be proportional to the error voltage, Ve. A double-clamped converter controlled in this way may deliver an amount of energy during each converter operating cycle that is substantially proportional to the square of the duration of the energy storage phase. Thus, in a double-clamped converter the power delivered by the converter may be controlled to be substantially proportional to the square of the error voltage, $Pout(t) = K \cdot Ve^2$. For the power factor corrected converter of FIGS. 6 and 7, in which the waveform of the converter input current, $i_{in}(t)$, is to be controlled to conform to the waveform of the converter input voltage, $V_{in}(t)$, the converter input power is equal to $Pin(t) = V_{in}(t) \cdot i_{in}(t) = V_{in}(t) \cdot (K \cdot V_{in}(t)) = K \cdot V_{in}(t)^2$, where K is a constant. Since the converter power output (ignoring losses), Pout(t), is substantially equal to the converter input power, Pin(t), controlling an error voltage Ve to comprise a time-varying component that follows the waveform of the input voltage $V_{in}(t)$ will result in the converter being controlled to perform power factor correction.

In FIG. 7, multiplier 323 multiplies the output of integrating error amplifier circuit 320, Vea, and the normalized waveform signal, Vn(t), to produce an error voltage Ve(t) that has the waveform of $V_{in}(t)$ and an amplitude that is proportional to Ve. Integrating error amplifier circuit 320 compares the DC converter output voltage, $V_{out}$, to a reference voltage, Vref, indicative of a pre-determined setpoint value for $V_{out}$, and adjusts Vea to maintain $V_{out}$ at the setpoint value. In this way, the amplitude and waveform of Ve are controlled both to perform power factor correction and regulate the converter output voltage to be at the desired setpoint value. Because the square of the signal Ve(t) is proportional to the operating power of the converter, it may also be used (squared, scaled and offset as required) to generate the signal Ps(t).

An advantage of using a double-clamped converter 300 is that the voltage, Vr, across clamp capacitor $C_R$ 326 (FIG. 6) is substantially proportional to the converter output voltage $V_{out}$. Use of Vr to indicate $V_{out}$ may reduce overall converter cost and complexity by eliminating the need for isolation circuitry that might otherwise be needed to measure $V_{out}$, e.g. as described in Clarkin, Primary Side Sampled Feedback Control in Power Converters, U.S. patent application Ser. No. 11/601,890.

The duration of the operating interval in the converter of FIGS. 6 and 7 may be controlled according to the following method:

1. With reference to FIG. 11, step 400: at a time (e.g., a time, $t_{dis}$) when the power delivery from the converter is enabled and the instantaneous power delivered to the converter input (Pin(t)=$V_{in}(t) \cdot i_{in}(t)$) falls below a pre-determined value, Pmin, disable power delivery from the converter and store a value, Vx, indicative of the value of the converter input voltage (e.g., indicative of $V_{in}(t_{dis})$);

2. With reference to FIG. 11, step 402: at a time (e.g., a time $t_{en}$) when power delivery from the converter is disabled and the input voltage is increasing and becomes greater than a value indicated by a threshold voltage Vx, enable the converter to deliver power.

Operation of the converter 100 of FIGS. 6 and 7, in accordance with the described control method, is described with reference to the steady-state waveforms of FIG. 8. In the description it is understood that use of the same symbols for both actual and measured signals is for ease of discussion. The measured signals may be scaled, level-shifted, filtered, or isolated by known means as needed. In FIG. 7, comparator 231 compares the signal Ps(t), indicative of the instantaneous magnitude of the converter input power, $P_{in}(t)$ (FIG. 8C), to a pre-determined value Pmin (Pmin may, for example, indicate a power value equal to 5% of the maximum rated power of the converter). When Ps(t) drops below Pmin, at time $t_{dis}$ (FIG. 8C), the output of comparator 231 goes high, triggering edge-triggered pulse generator 235. The rising edge of the output of pulse generator 235 resets flip-flop 241, causing the Enable signal 294 to go low (FIG. 8D) and a Disable signal to go high and disabling the converter 300 from delivering power. The rising edge of the output of pulse generator 235 also triggers edge-triggered sample-and-hold circuit 243 to store and output a value $V_x=V_{in}(t_{dis})=V_{inx}$ (FIGS. 7 and 8A). The value $V_x$ represents a threshold voltage for triggering the Enable signal 294. Comparator 233 compares $V_{in}(t)$ to Vx and, at time $t_{en}$, when $V_{in}(t)$ has increased above $V_{inx}$ (FIG. 8A), the output of comparator 233 goes high, triggering edge-triggered pulse generator 239 via AND gate 237. The rising edge of the output of pulse generator 239 sets flip-flop 241, causing the Enable signal 294 to go high (FIG. 8D) and the Disable signal to go low, enabling the converter 300 to deliver power. By the process described, the duration of the operating interval of the converter 300 ($T_x$, FIG. 8C) may be controlled as a function of load power, i.e. to increase with increasing load power and decrease with decreasing load power. At relatively high operating power levels the duration of the operating interval may be close in value to T1 and the phase angle may be adjusted to center the operating interval about the peak of the voltage waveform. Furthermore, while the converter 300 is enabled, the converter input current $i_{in}(t)$ (FIG. 8B) may be power factor controlled to follow the waveform of the input voltage $V_{in}(t)$, as previously described. The term "full PFC" may appropriately describe operation for operating intervals approximating T1 in duration. However, operation for shorter operating intervals (i.e. at lower power levels) may more appropriately be called "partial PFC" because, although the current envelope essentially matches the input voltage waveshape during the operating interval, it is essentially flat (i.e. zero) outside of the operating interval.

In order for the operating interval to start at the appropriate time ($t_{en}$, FIG. 8A) it is necessary that $V_{in}$ drop below Vinx at some time prior to $t_{en}$. Owing to the presence of the rectifier 130 and input capacitance 350, however, the rate of decline of the voltage $V_{in}$ during the time that the converter is disabled may be very small, or substantially zero, as illustrated in FIG. 8A. Furthermore, transfer of energy from AC source inductance (not shown) to the converter input capacitance 350 after the converter is disabled may actually cause the converter input voltage to increase following $t_{dis}$. Some or all of these factors may prevent the converter input voltage from declining below Vinx prior to the next occurrence of the AC source rising to equal Vinx, thereby interfering with the described operation of the converter.

One way to ensure that the input voltage declines during the period that the converter is disabled is to provide a dissipative load. Use of a dissipative load, however, conflicts with the objective of minimizing wasted energy. Where the input waveform is known, e.g. for use with AC mains which use 50 or 60 Hz sine waves, a phased locked loop may be used to synchronize an internal timing and amplitude reference for the input waveform, e.g. to avoid the input capacitance issue during light loads. The synchronized internal reference may then be used to turn the converter on and off at the appropriate times. Another solution allows the converter to continue to operate in a modified disabled mode processing small amounts of power for delivery to the converter bias circuitry during the disable periods. In the modified disable mode, the main output switch may be disabled, decoupling the converter from the load. The bias circuitry which may be coupled to a secondary winding may continue to operate thus allowing power to be directed to the converter bias circuitry. To reduce the amount of power processed during each converter operating cycle, the reference voltage to the controller may be reduced, e.g. to a level below the clamp capacitor voltage, to force the controller to adjust the switch ON and OFF times to reduce the amount of power being processed in the converter. The modified disable mode thus draws power from the input capacitance to draw down the input voltage and supplies it to the converter bias circuitry which is necessary to operate the converter and thus avoids the waste associated with a passive approach.

Figure 10:
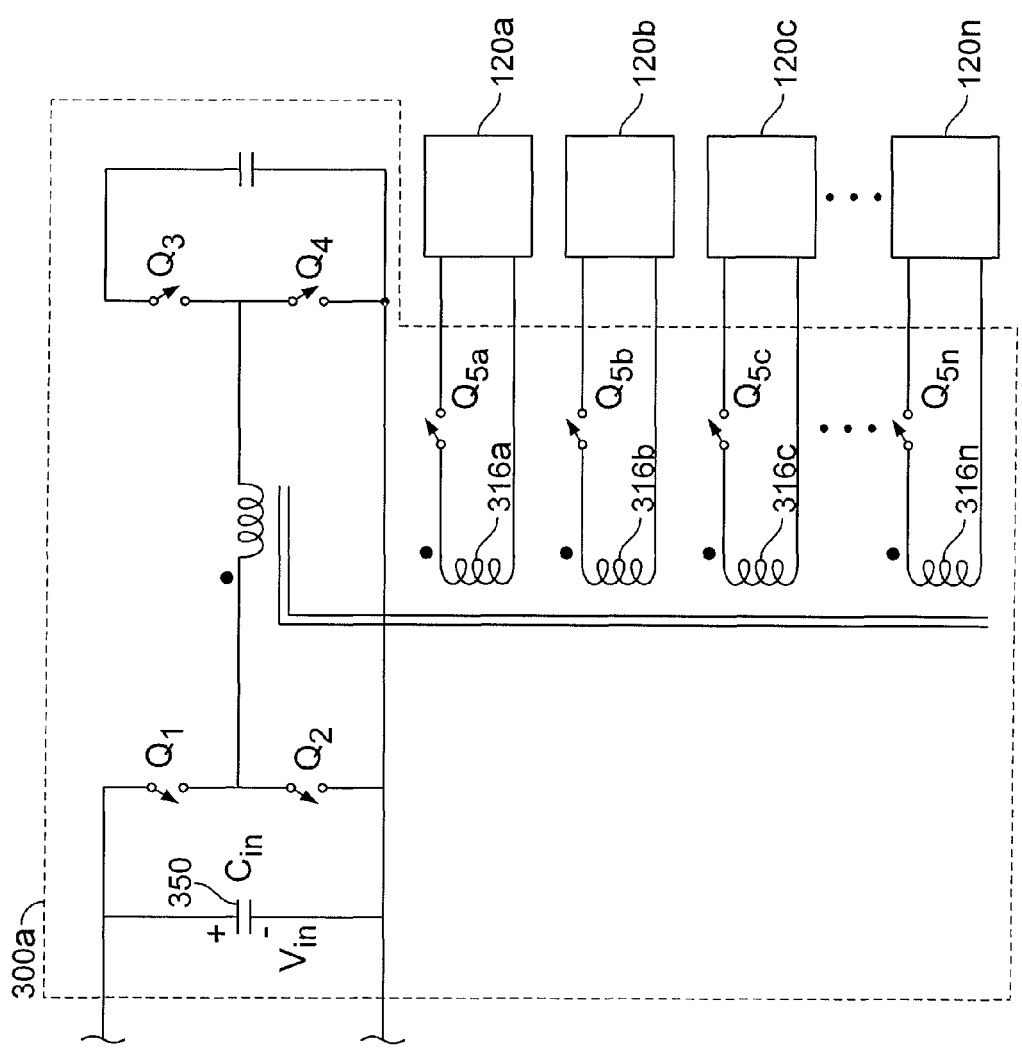
FIG. 10 shows a double-clamped ZVS buck-boost power converter comprising several outputs.

FIG. 10 shows the converter 300a similar to converter 300 (FIG. 6) but having a multiplicity of outputs 120a-120n. The main output 120a may deliver power to the main load as described above, relatively low power bias output 120b may be used to deliver power to essential supervisory and control circuitry (e.g., bias power for converter 300 and/or other circuitry), and outputs 120c-120n supply power to other non-essential loads. Switches Q5a and Q5c-Q5n may be held off during the time that the converter is disabled, i.e. during the modified disable mode, preventing power transfer to their respective outputs, whereas switches Q1-Q4 and switch Q5b may continue to be controlled to provide bias power via secondary 316b as a means of "bleeding" energy out of the input capacitance 350 and reducing $V_{in}$. A benefit of this approach is that substantially no energy is wasted (compared to a dissipative approach, and ignoring the small amount of switching loss associated with operating the switches) because operating the bias output(s) during the time when the rest of the outputs are disabled alters only the time periods during which energy is transferred to the bias outputs and does not alter the total amount of bias power delivered.

Waveforms for the power supply system 100 of FIGS. 6 and 7, at four different power levels, are shown in FIGS. 9A through 9D. FIG. 9A shows the average load power delivered by the switching power converter 110 during selected time intervals. FIG. 9B shows the corresponding converter input voltage waveform during each respective interval, all having the same peak voltage Vinp. FIG. 9C shows the corresponding instantaneous power, $Pin(t)=V_{in}(t) \cdot i_{in}(t)$ drawn by the converter. And FIG. 9D shows the corresponding envelope of the pulsating input current, of the switching power converter 110 during each respective interval. The time period T1, corresponding to one-half cycle of the AC source 140, is the characteristic period of the unipolar time-varying input voltage $V_{in}$.

Between times ta and tb, the switching power converter 110 is delivering a relatively large amount of average power, P1, (FIG. 9A). Because P1>>Pmin (the instantaneous value of power below which the converter 110 is disabled, FIG. 9C), the operating interval during which the switching power converter 110 is enabled, Tx1, comprises almost the full characteristic period, T1 (FIG. 9D). Between times ta and tb, the peak amplitude of the envelope of the input current $i_{in}$ is shown to be I1.

Between times tc and td, the average power delivered by the switching power converter 110 is reduced to P2<P1, (FIG. 9A). Because P2 is less than P1, but still relatively large compared to Pmin, the operating interval, Tx2, during which the switching power converter 110 is enabled is shorter than Tx1 but still comprises a relatively large portion of the full characteristic period, T1 (FIG. 9D). Between times tc and td, the peak amplitude of the envelope of the input current $i_{in}$ is reduced to I2<I1.

Between times te and tf, the average power delivered by the switching power converter 110 is reduced to P3<P2<P1, (FIG. 9A) and, as illustrated in FIG. 9D, the operating interval, Tx3, during which the switching power converter 110 is enabled has been further reduced to Tx3<Tx2<Tx1. Between times te and tf, the peak amplitude of the envelope of the input current $i_{in}$ is also reduced to I3<I2<I1.

Between times tg and th, the average power delivered by the switching power converter 110 is further reduced to P4<P3<P2<P1, (FIG. 9A) and, as illustrated in FIG. 9D, the operating interval, Tx4, during which the switching power converter 110 is enabled has been further reduced to Tx4<Tx3<Tx2<Tx1. Between times tg and th, the peak amplitude of the envelope of the input current $i_{in}$ is also reduced to I4<I3<I2<I1.

Figure 13:
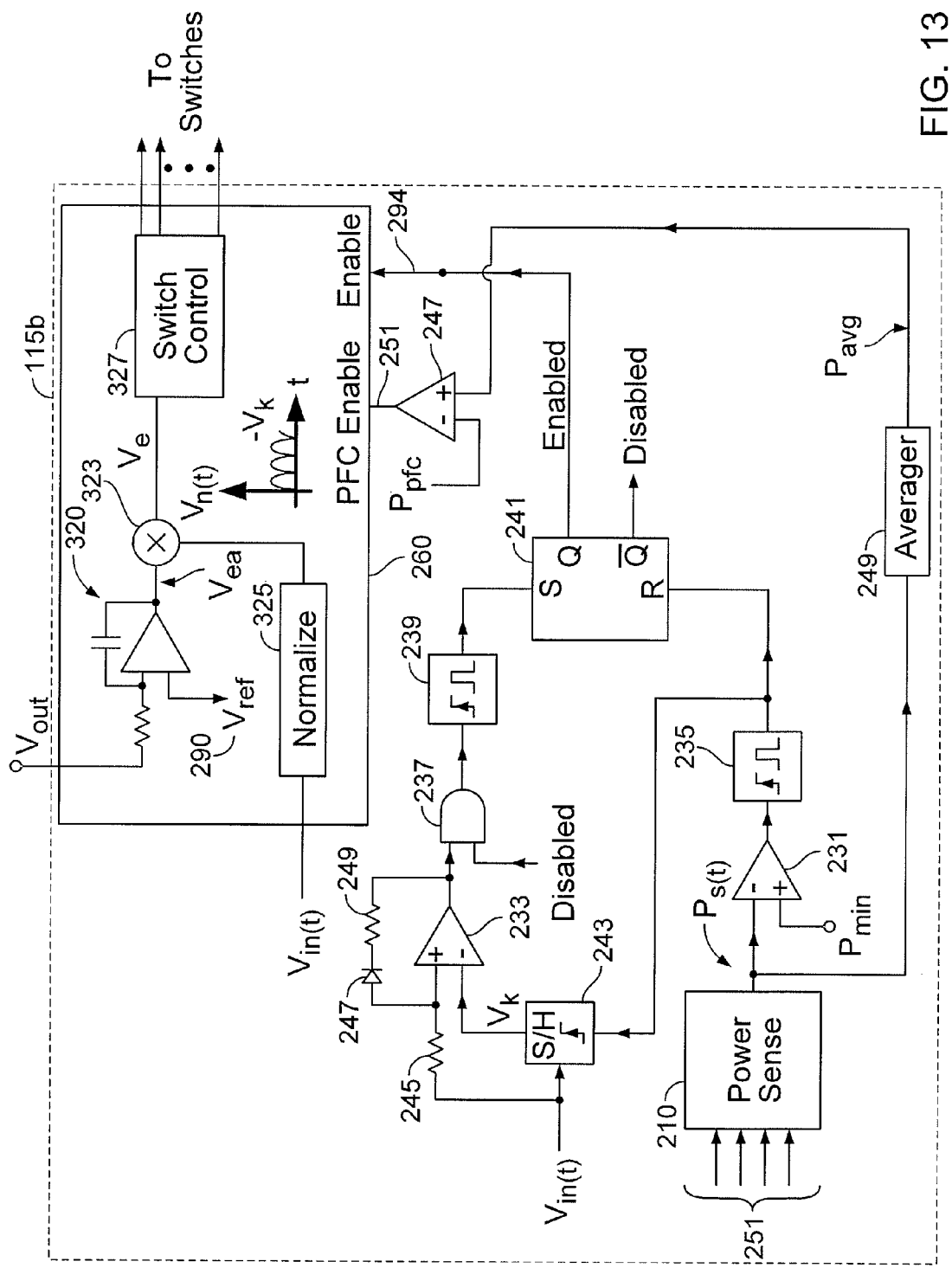
FIG. 13 shows another block diagram of a controller for use in the power supply system of FIG. 6.

Regulatory requirements may demand that a power converter perform power factor correction when the input power to the converter is above a pre-determined threshold level. Therefore, in some embodiments, in which a power converter may be required to operate over a range of power levels, a controller according to the present disclosure may be configured to perform power factor correction when the converter operating power (i.e., the average value of Ps(t)) is above a pre-determined level, Ppfc, and may be disabled from performing power factor correction when the converter operating power is below Ppfc. FIG. 13, for example, shows a controller 115b that is a modified version of the controller 115a of FIG. 7. In FIG. 13, the controller 115b additionally comprises an averager 249 that delivers an output signal Pavg that is the average value of the instantaneous power Ps(t), and a comparator 247 that compares Pavg to a pre-determined threshold average power value, Ppfc. When Pavg is greater than Ppfc, the PFC Enable input 251 of switch controller 260 is brought high, enabling the switch controller 260 to perform power factor correction; when Pavg is less than Ppfc, the PFC Enable input 251 of switch controller 260 is brought low, disabling the switch controller 260 from performing power factor correction. When power factor correction is disabled, the controller 260 may control $V_{out}$ by any of a variety of known control methods.

In some ideal embodiments, the operating interval may be substantially symmetrically centered in time around the time of occurrence of the peak value of the AC source voltage (e.g., time Tp, FIGS. 5 and 8A). In some actual embodiments the operating interval may be substantially symmetrically centered in time around Tp at relatively high operating power levels, but may diverge from being symmetrically centered as the operating power level is reduced. In actual embodiments, the degree to which the operating interval may diverge from being symmetrically centered around Tp may depend upon one or more factors, including, e.g., the amount of power being delivered by the converter, the amount of converter input capacitance (Cin 350, FIG. 2) and the control strategy employed. However, in a converter according to the invention, the duration of operating intervals under steady-state operating conditions may be controlled to be less than the characteristic period, T1, by controlling the times at which the operating intervals begin and end (e.g., times $t_{en}$ and $t_{dis}$, respectively, FIG. 8A) to occur closer in time to the time Tp.

The elements of the controller 115a of FIG. 7 or 115b of FIG. 13 are exemplary and may be embodied in a variety of ways. Some or all of the controller may be implemented as hardware or as software code and/or logical instructions that are processed by a digital processor or other means, or a combination of both. The logical processes may run concurrently or sequentially with respect to each other or with respect to other processes, such as measurement processes, voltage regulation processes and related calculations. Controllers may be implemented in mixed-signal circuitry; in circuitry comprising mixed-signal circuitry comprising a microprocessor and/or digital processor core; or in circuitry comprising a combination of mixed-signal circuitry and a separate microprocessor or digital signal processor. The controller may be implemented as an integrated circuit or a hybrid device. There may also be additional functions associated with the controller. Pre-determined values, such as the durations of the maximum and minimum operating intervals and the reference voltage, may be stored in read-only or re-programmable non-volatile memory.

In preferred embodiments, the controller 115a may, as shown in FIG. 12, comprise a microcontroller 500 (e.g., a type C8051F330 microcontroller, as described in a datasheet entitled *C8051F330/1/2/3/4/5 Mixed Signal ISP Flash MCU Family*, Rev. 1.5, 1/06, manufactured by Silicon Labs, Inc., 4635 Boston Lane, Austin, Tex., USA); one or more analog-to-digital converters 412, 414, 416 for converting analog inputs into n-bit digital signals 410, 420, 430; and drivers 440 for, e.g., driving switches Q1-Q5n (FIG. 10). Controller functions, such as the integrating error amplifier circuit 320; normalizer 325; multiplier 323; comparators 231, 233 and switch control circuitry 327 and other circuitry and algorithms associated with PFC and switch controller 260 may, e.g., be implemented as software algorithms and may be stored as software code (e.g., in code memory 510, FIG. 12); real-time data and values of pre-defined constants may be stored in one or more forms of data memory (e.g., data memory 520, FIG. 12).

A number of embodiments of the invention have been described. Nevertheless, it will be understood that various modifications may be made without departing from the spirit and scope of the invention. For example, although the operation described above shows an operating interval occurring during each unipolar pulse, 0-T1, T1-T2, T2-T3, etc., at very low power levels, the controller may skip one or more unipolar pulses, between operating intervals, inhibiting operating intervals during the skipped unipolar pulses, e.g. enabling operating intervals for every second or third unipolar pulse. Furthermore, one or more of the loads 120a, 120b, 120c, 120n in FIG. 10 may comprises a DC-DC converter such as converter 160 shown in FIG. 2. Accordingly, other embodiments are within the scope of the following claims.

What is claimed is:

1. Apparatus comprising:
   an unipolar input for receiving a pulsating unipolar input voltage characterized by a series of unipolar pulses, the pulses being characterized by a pulse waveform, a pulse duration, and a characteristic frequency,
   a first DC-DC switching power converter for converting power received from the unipolar input for delivery to a first load via a first output at a first DC output voltage, the first DC-DC switching power converter comprising one or more switches, and
   a controller for operating the one or more switches in a series of converter operating cycles, to control the first DC output voltage to be substantially equal to a pre-determined value over a range of power levels delivered by the converter,
   wherein the converter operating cycles comprise a duration defining a converter operating period,
   wherein the converter operating period is 1% or less of the pulse duration,
   wherein the first power converter is adapted to convert power via the first output for delivery to the first load during an operating interval, the operating interval comprising a selected portion of the pulse duration, and to refrain from converting power via the first output for delivery to the first load during the remainder of the pulse duration; and to vary the duration of the operating interval as a function of the magnitude of the power converted by the first DC-DC switching power converter.

2. The apparatus of claim 1 wherein the first DC-DC switching power converter comprises a flyback converter.

3. The apparatus of claim 1 wherein the first load comprises a second DC-DC converter that delivers power to first load circuitry.

4. The apparatus of claim 1 further comprising an AC input for receiving power from an AC source and a rectifier having an input connected to the AC input and an output connected to the unipolar input.

5. The apparatus of claim 4 wherein the rectifier provides full-wave rectification, the AC source has a frequency that is one half of the characteristic frequency of the unipolar input voltage and has a period that is approximately twice the pulse duration.

6. The apparatus of claim 5 further comprising an input capacitance connected across the unipolar input.

7. The apparatus of claim 1 wherein the controller adjusts the phase angle of the operating interval relative to the unipolar input towards centering the operating interval about a peak in the pulse waveform.

8. The apparatus of claim 7 wherein a current operating interval is terminated at a time, $t_{dis}$, when instantaneous power being delivered by the converter falls below a pre-determined value, $P_{min}$; and a successive operating interval is begun at a time following $t_{dis}$, when the instantaneous unipolar input voltage is increasing and becomes greater than a predetermined threshold voltage, $V_{th}$.

9. The apparatus of claim 8 wherein the predetermined threshold voltage, $V_{th}$, is set to a value corresponding to the instantaneous unipolar input voltage at the time, $t_{dis}$, that the current operating interval is closed.

10. The apparatus of claim 1 wherein the first DC-DC switching power converter comprises a double-clamped buck-boost converter.

11. The apparatus of claim 10 wherein the switch controller adjusts the envelope of current drawn during the operating interval by the first DC-DC power converter from the unipolar input to approximate the pulse waveform during the operating interval.

12. The apparatus of claim 10 wherein the switch controller adjusts the envelope of current drawn during the operating interval by the first DC-DC power converter from the unipolar input to approximate the pulse waveform during the operating interval when the power delivered by the converter is greater than a pre-determined value.

13. The apparatus of claim 10 wherein the first power converter further comprises a second output for delivering power to a second load and wherein the first power converter is adapted to convert power via the second output for delivery to the second load during the operating interval.

14. The apparatus of claim 13 wherein the first power converter is further adapted to refrain from converting power via the second output for delivery to the second load at times outside of the operating interval.

15. The apparatus of claim 13 wherein the first power converter is further adapted to convert power via the second output for delivery to the second load at times outside of the operating interval.

16. The apparatus of claim 1 wherein the switch controller adjusts the envelope of current drawn during the operating interval by the first DC-DC power converter from the unipolar input to approximate the pulse waveform during the operating interval.

17. The apparatus of claim 16 wherein the controller is configured to control the amount of energy delivered during each converter operating cycle to vary as a function of the square of an error signal; and further comprising:
   an integrating amplifier configured to compare a signal indicative of the first output voltage to a signal indicative of a desired value for the first output voltage, and produce an integrated error signal;
   a normalizer configured to produce an envelope signal representing a desired value for the current drawn from the unipolar input; and a multiplier configured to provide the error signal representative of the product of the integrated error signal and the envelope signal.

18. The apparatus of claim 17 wherein the first DC-DC switching power converter comprises a double-clamped buck-boost converter and the controller is configured to control the duration of an energy storage phase within a converter operating cycle to increase in proportion to an increase in the error signal.

19. The apparatus of claim 17 wherein the envelope signal includes variations synchronized to the unipolar input voltage and approximating the pulse waveform.

20. The apparatus of claim 17 further comprising an AC input for receiving power from an AC source and a rectifier having an input connected to the AC input and an output connected to the unipolar input and wherein the envelope signal includes variations synchronized to the AC source and approximating a waveform of the absolute value of the AC source.

21. The apparatus of claim 17 wherein the controller adjusts the phase angle of the operating interval relative to the unipolar input towards centering the operating interval about a peak in the pulse waveform.

22. The apparatus of claim 21 further comprising a power sense circuit for delivering a signal indicative of the instantaneous power processed by the first DC-DC switching power converter.

23. The apparatus of claim 22 wherein a current operating interval is closed at a time, $t_{dis}$, when instantaneous power being delivered by the converter falls below a pre-determined value, $P_{min}$; and a successive operating interval is opened at a time following $t_{dis}$, when the instantaneous unipolar input voltage is increasing and becomes greater than a predetermined threshold voltage, $V_{th}$.

24. The apparatus of claim 23 wherein the predetermined threshold voltage, $V_{th}$, is set to a value corresponding to the instantaneous unipolar input voltage at the time, $t_{dis}$, that the current operating interval is closed.

25. The apparatus of claim 1 wherein the switch controller adjusts the envelope of current drawn during the operating interval by the first DC-DC power converter from the unipolar input to approximate the pulse waveform during the operating interval when the power delivered by the converter is greater than a pre-determined value.

26. The apparatus of claim 25 wherein the controller refrains from adjusting the envelope of the input current during the operating interval when the power delivered by the converter is less than a pre-determined value.

27. The apparatus of claim 1 wherein the controller is configured to increase the duration of the operating interval as the power delivered by the first DC-DC converter increases.

28. The apparatus of claim 27 wherein the controller is configured to set the duration of the operating interval to a predetermined maximum whenever the magnitude of the power converted by the first DC-DC switching power is above a pre-determined value.

29. The apparatus of claim 28 wherein the predetermined maximum comprises 98% or more of the pulse duration.

30. The apparatus of claim 28 wherein the predetermined maximum comprises the rectification period.

31. The apparatus of claim 1 wherein the first power converter further comprises a second output for delivering power to a second load and wherein the first power converter is adapted to convert power via the second output for delivery to the second load during the operating interval.

32. The apparatus of claim 31 wherein the first power converter is further adapted to refrain from converting power via the second output for delivery to the second load at times outside of the operating interval.

33. The apparatus of claim 31 wherein the first power converter is further adapted to convert power via the second output for delivery to the second load at times outside of the operating interval.

34. A method comprising:
receiving at an input, a pulsating unipolar input voltage characterized by a series of unipolar pulses, the pulses being characterized by a pulse voltage-waveform, a pulse duration, and a characteristic frequency,
converting, in a first DC to DC power conversion stage, power received from the pulsating unipolar input in a series of converter operating cycles, each having a duration that is 1% or less of the pulse duration, for delivery to a first load connected to a first output at a first DC output voltage,
controlling the first DC output voltage to be substantially equal to a pre-determined value over a range of power levels delivered by the first power conversion stage,
enabling the converting via the first output for delivery to the first load during an operating interval comprising a selected portion of the pulse duration,
disabling the converting via the first output for delivery to the first load during the remainder of the pulse duration;
varying the duration of the operating interval as a function of the magnitude of the power converted by the first DC-DC power conversion stage, and
adjusting an envelope of current drawn during the operating interval by the first DC-DC power conversion stage from the input to approximate the pulse voltage waveform during the operating interval for predetermined operating criteria.

35. The method of claim 34 wherein the predetermined operating criteria include all power levels in the range of power levels delivered by the first power conversion stage.

36. The method of claim 34 wherein the predetermined operating criteria comprises power levels within the range exceeding a predetermined threshold.

37. The method of claim 36 further comprising essentially fixing the duration of the operating interval at a predetermined maximum duration for power levels within the first portion of the range.

38. The method of claim 37 wherein the predetermined maximum duration is set essentially equal to a rectification period.

39. The method of claim 37 wherein the predetermined maximum duration is less than the rectification period.

40. The method of claim 34 wherein the controller varies the duration of the operating interval when the power delivered to the output is within a second portion of the range of power levels.

41. The method of claim 40 wherein the second portion of the range comprises power levels within the range below a predetermined threshold.

42. The method of claim 40 further comprising reducing the duration of the operating interval as the power delivered to the output is reduced within the second portion of the range.

43. The method of claim 34 further comprising providing galvanic isolation between the input and the first output.

44. The method of claim 34 further comprising adjusting the phase angle of the operating interval relative to the unipolar input towards centering the operating interval about a peak in the pulse waveform.

45. The method of claim 44 further comprising terminating a current operating interval at a time, $t_{dis}$, when instantaneous power being delivered by the converter falls below a predetermined value, and starting a successive operating interval at a time following $t_{dis}$, when the instantaneous unipolar input voltage is increasing and becomes greater than a predetermined threshold voltage, $V_{th}$.

46. The method of claim 45 further comprising setting the predetermined threshold voltage, $V_{th}$, to a value corresponding to the instantaneous unipolar input voltage at the time, $t_{dis}$, that the current operating interval is closed.

47. The method of claim 34 further comprising inhibiting operating intervals during selected ones of the unipolar pulses in the series of unipolar pulses.

48. The method of claim 47 wherein the selected ones are separated by at least one unipolar pulse.

49. The method of claim 34 further comprising receiving power from an AC source, rectifying the received power, and supplying the rectified power to the input.

50. The method of claim 34 further comprising storing energy received from the output.

51. The method of claim 34 further comprising converting power received from the output for delivery of a second DC output voltage to a regulator output, wherein the first DC output voltage is greater than the second DC output voltage.

52. The method of claim 51 further comprising providing a plurality of second DC output voltages to a plurality of regulator outputs.

53. A method for controlling the duration of an operating interval in a switching power converter that receives power from a pulsating input source, each of the pulses occurring within a characteristic period defined by a characteristic frequency of an input source, and delivers power to a first output during the operating interval, the operating interval comprising a selected portion of a characteristic period, and refrains from delivering power to the first output during the remainder of the characteristic period, the method comprising:

disabling power delivery from the converter at a time, tdis, when power delivery from the converter is enabled and the instantaneous power being delivered to the converter input falls below a pre-determined value, Pmin, and enabling power delivery from the converter, at a time following tdis, when power delivery from the converter is disabled, the converter input voltage is increasing, and the converter input voltage becomes greater than the value that it was at time tdis.

54. The method of claim 53 further comprising:

determining and storing a value Vx, indicative of the value of the converter input voltage at time tdis, and determining, at a time following tdis and when the converter input voltage is increasing, when the converter input voltage becomes greater than the value indicated by Vx.

* * * * *

UNITED STATES PATENT AND TRADEMARK OFFICE
CERTIFICATE OF CORRECTION

PATENT NO. : 8,222,772 B1  Page 1 of 1
APPLICATION NO. : 12/701983
DATED : July 17, 2012
INVENTOR(S) : Patrizio Vinciarelli It is certified that error appears in the above-identified patent and that said Letters Patent is hereby corrected as shown below:

Col. 19, line 1, delete "value," and insert -- value, $P_{min}$; --.

Col. 20, line 9, delete "tdis" and insert -- $t_{dis}$ --.

Col. 20, line 12, delete "Pmin" and insert -- $P_{min}$ --.

Col. 20, line 14, delete "tdis" and insert -- $t_{dis}$ --.

Col. 20, line 17, delete "tdis" and insert -- $t_{dis}$ --.

Col. 20, line 20, delete "tdis" and insert -- $t_{dis}$ --.

Col. 20, line 21, delete "tdis" and insert -- $t_{dis}$ --.

Signed and Sealed this
Twelfth Day of March, 2013

Teresa Stanek Rea
*Acting Director of the United States Patent and Trademark Office*